US012798055B2

(12) United States Patent
Yelinek, Jr.

(10) Patent No.: US 12,798,055 B2
(45) Date of Patent: Nov. 17, 2026

(54) FLUX CORE WELDING GUN WRENCH

(71) Applicant: Mark Edward Yelinek, Jr., York, ME (US)

(72) Inventor: Mark Edward Yelinek, Jr., York, ME (US)

( * ) Notice: Subject to any disclaimer, the term of this patent is extended or adjusted under 35 U.S.C. 154(b) by 252 days.

(21) Appl. No.: 18/804,304

(22) Filed: Aug. 14, 2024

(65) Prior Publication Data

US 2026/0048485 A1 Feb. 19, 2026

(51) Int. Cl.
*B25B 13/04* (2006.01)
*B25B 13/48* (2006.01)
*B25B 15/00* (2006.01)

(52) U.S. Cl.
CPC .............. *B25B 13/04* (2013.01); *B25B 13/48* (2013.01); *B25B 15/008* (2013.01)

(58) Field of Classification Search
CPC .. B23K 9/26; B23K 9/32; B25B 13/04; B25B 13/48; B25B 13/481; B25B 15/008
See application file for complete search history.

(56) References Cited

U.S. PATENT DOCUMENTS 4,417,487 A * 11/1983 Stephens ................. B08B 1/165 81/53.2
5,778,896 A 7/1998 Seals et al.
5,974,917 A * 11/1999 Way ......................... B23K 9/26 81/124.1
6,093,907 A * 7/2000 Hidaka .................. B23K 9/122 219/137.61
6,202,514 B1 * 3/2001 Kirk ........................ B25B 13/56 81/3.4
6,279,434 B1 8/2001 Brown
6,739,224 B1 5/2004 Wershe
6,901,823 B2 6/2005 Ernesti
7,293,312 B2 11/2007 Chmelar
7,530,295 B2 5/2009 Jones et al.
7,663,074 B2 * 2/2010 Wells ....................... B23K 9/32 219/137.31
8,136,427 B2 3/2012 James
8,686,312 B2 * 4/2014 Machan ............. B23K 11/3072 29/253
9,452,511 B2 * 9/2016 Nguyen .................. B25B 13/48
10,207,398 B2 2/2019 Ma
10,730,170 B2 * 8/2020 Schuster ................. B25B 13/54
10,974,380 B1 4/2021 Diaz
11,478,906 B2 10/2022 Sheehan et al.
11,571,798 B2 * 2/2023 Statman .................... B25F 1/00
11,654,541 B2 5/2023 Tsai et al.
12,122,024 B2 * 10/2024 Spencer, Jr. ............ B25B 13/08
2018/0215027 A1 8/2018 Holm, Jr.
2018/0281165 A1 10/2018 Kempiak
2019/0084142 A1 3/2019 Vu
2023/0100705 A1 3/2023 Spencer, Jr.
2023/0140488 A1 * 5/2023 Falk ........................ B25B 13/56 81/437

* cited by examiner

*Primary Examiner* — David B. Thomas
(74) *Attorney, Agent, or Firm* — Dunlap Bennett & Ludwig PLLC

(57) ABSTRACT

A wrench to aid with taking apart a flux core welding gun is disclosed. The wrench decreases any risk of damaging the tip holder as well makes it so it stays in the wrench, so the user does not have to physically handle the tip holder in order to remove it from the welding gun.

5 Claims, 4 Drawing Sheets

FLUX CORE WELDING GUN WRENCH

BACKGROUND OF THE INVENTION

The present invention relates to flux core welding guns and, more particularly, to a wrench that can be used to remove the tip holder of a flux core welding gun.

The tip holder on a flux core welding gun is too hot to touch and can be difficult to unscrew. The user could use a conventional wrench, but they will not have a good grab on the tip holder. Conventional tip holders are made from brass, so the risk of damaging it when using conventional wrenches is also high. Often, when using conventional wrenches, the user must also physically grab the tip with their hands, which can lead to serious injury, as even with a glove on the tip is extremely hot.

Accordingly, an improved device for removing a tip holder from a conventional flux core welding gun is desired.

SUMMARY OF THE INVENTION

In one aspect of the present invention, there is disclosed a wrench that is specifically constructed and adapted to safely and easily remove the tip holder of a conventional flux core welding gun.

The unique design of the wrench of the present invention decreases any risk of damaging the tip holder when removing it from a conventional flux core welding gun, and is designed to maintain the tip holder within the wrench once removed, such that the user does not have to physically handle the tip holder.

These and other features, aspects and advantages of the present invention will become better understood with reference to the following drawings, description and claims.

DETAILED DESCRIPTION OF THE INVENTION

Figure 1:
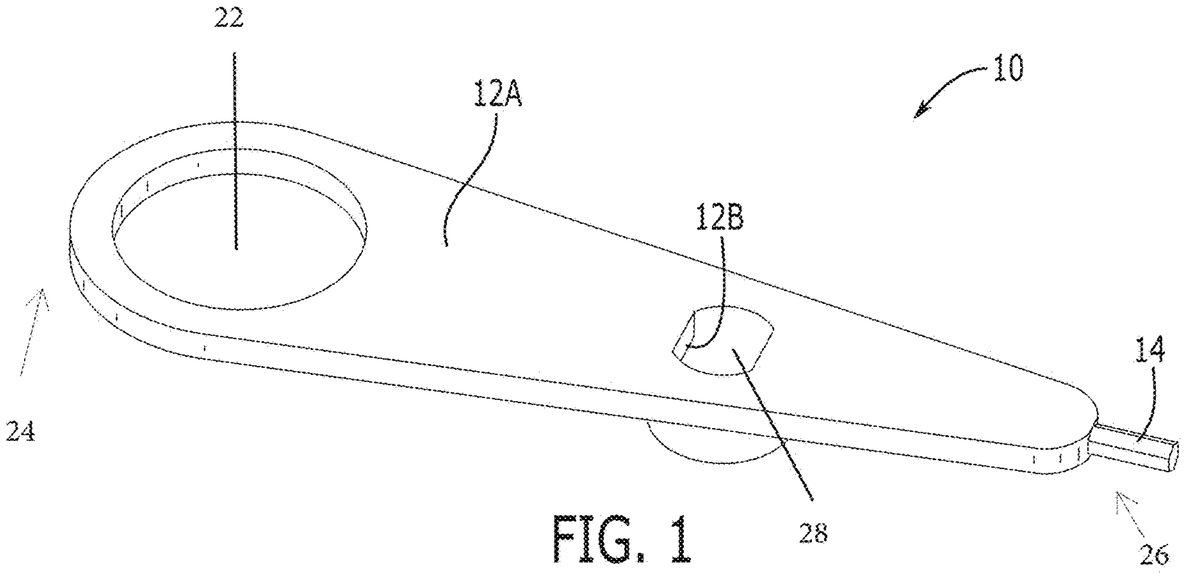
FIG. 1 is a top perspective view of a flux core welding gun wrench in accordance with a preferred embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a wrench that is specifically designed and adapted to safely remove the tip holder of a flux core welding gun.

As discussed above, the tip holder on a flux core welding gun is too hot to touch and can often be difficult to unscrew. The present invention solves these and other problems with conventional devices and methods.

In a preferred embodiment, the wrench of the present invention allows the user to take off/put on (e.g., twist on/off) the tip holder of a conventional flux core welding gun without ever touching it. Conventional tip holders are made of brass and are therefore susceptible to damage when removing and/or installing the tip holder from the flux core welding gun. Often, when using conventional wrenches, the user must also physically grab the tip holder with their hands, which can lead to serious injury, as even with a glove the tip holder is extremely hot.

The unique design of the wrench of the present invention, in contrast, not only decreases any risk of damaging the tip holder as it stays in the wrench once removed, but the design also enables the tip holder to be removed without the user having to physical touch the tip holder.

In a preferred embodiment, as seen in FIGS. 1-7, the flux core welding gun wrench 10 of the present invention comprises a base 12A having an opening 22 at a first end 24 and an Allen key 14 at an opposite end 26. In a center portion of base 12A there is another opening 28 that is designed and adapted to engage the tip holder 18C of a flux core welding gun 20. In a preferred embodiment base 12A is generally flat, with first end 24 being larger than opposite end 26, which can aid in using wrench 26 and in particular Allen key 14 to separate the welding gun neck from the base of the gun. In addition, opening 22 can aid in using wrench 10 in removing tip holder 18C.

Figure 2:
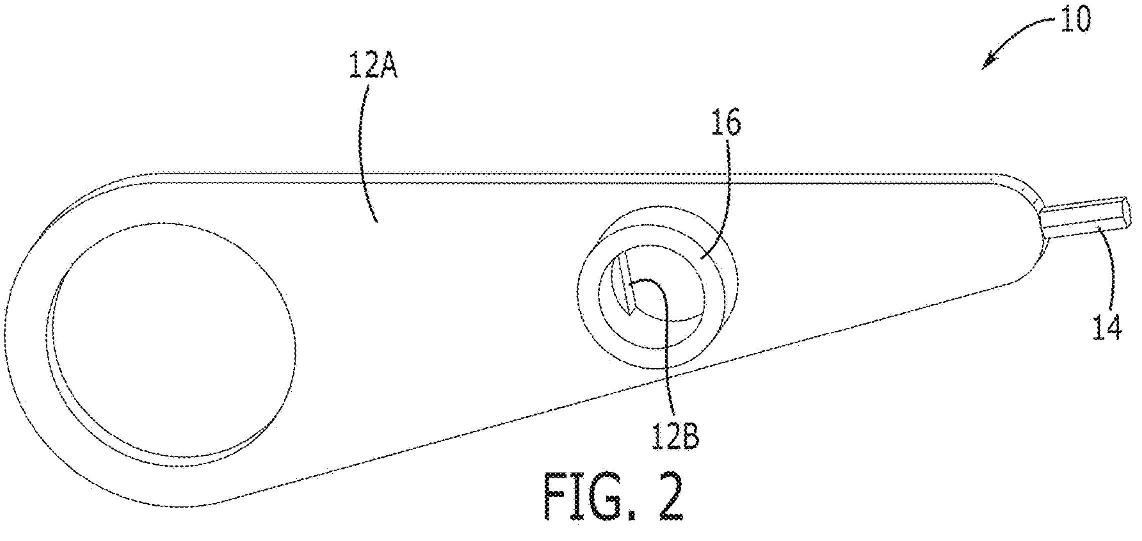
FIG. 2 is a side elevation perspective view of a flux core welding gun wrench in accordance with a preferred embodiment of the present invention.
Figure 3:
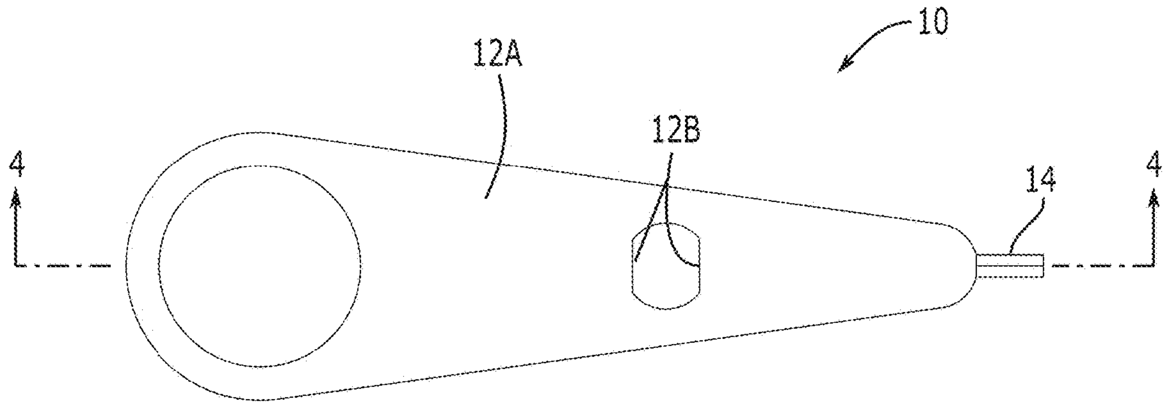
FIG. 3 is a plan view of a flux core welding gun wrench in accordance with a preferred embodiment of the present invention.
Figure 4:
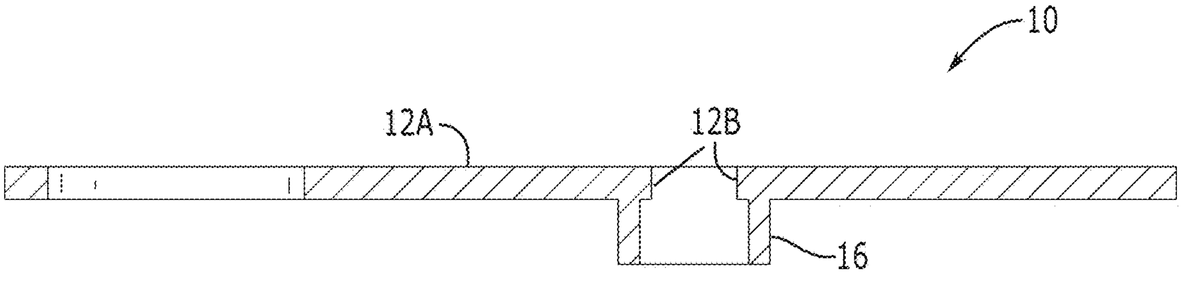
FIG. 4 is a cross-sectional view of a flux core welding gun wrench in accordance with a preferred embodiment of the present invention taken along line 4-4 of FIG. 3.

As seen in FIGS. 2-4, by way of example, base 12A comprises a coupler tube 16 on the back side of base 12 proximate opening 28. In addition, opening 28 comprises a wrench jaw 12B on each side of opening 28. Wrench jaws 12B are designed to engage corresponding flats 30 on tip holder 18C to remove tip holder 18C from flux core welding gun 20.

Figure 5:
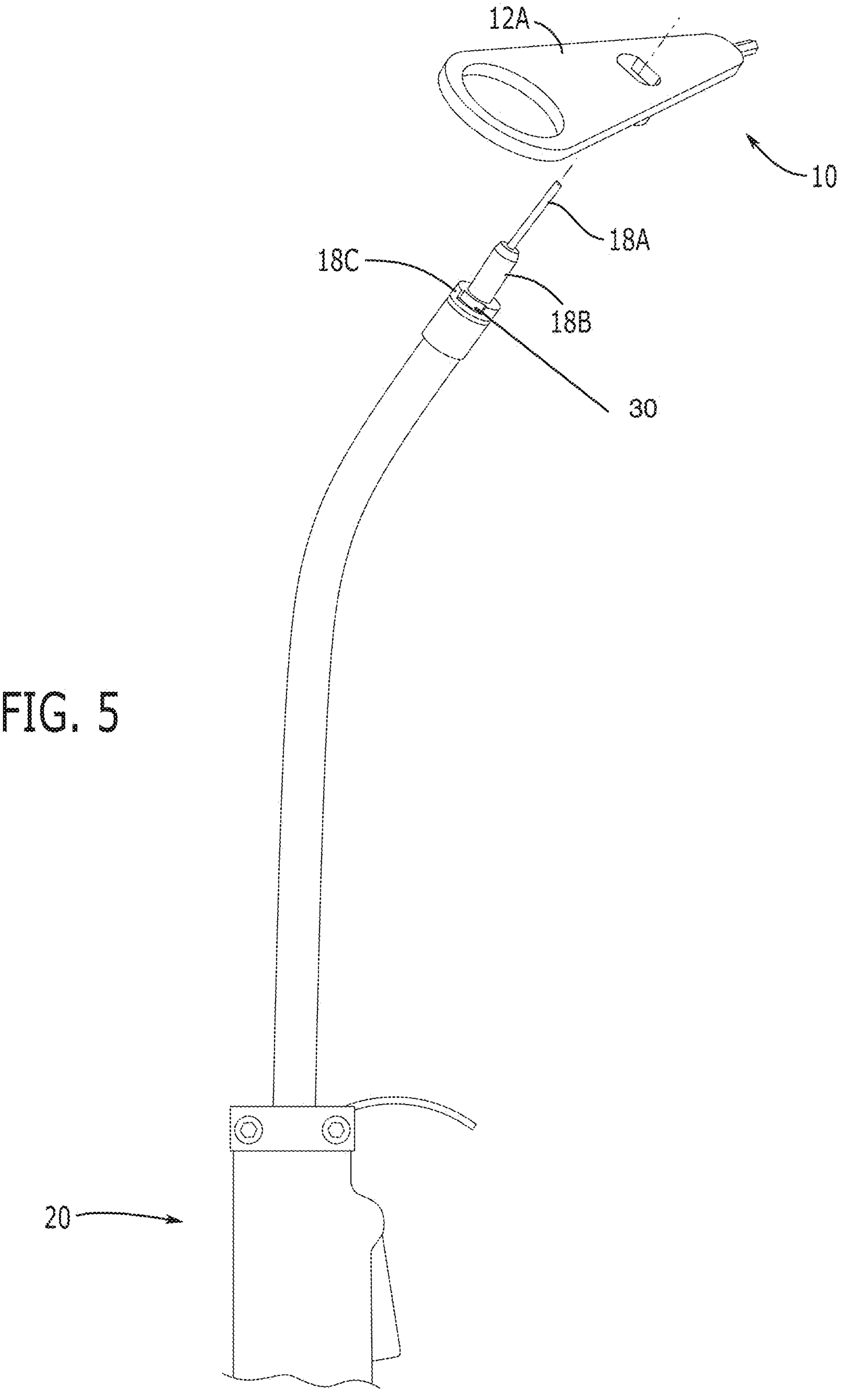
FIG. 5 is a partially exploded perspective view of a flux core welding gun wrench in accordance with a preferred embodiment of the present invention.

As seen in FIG. 5, flux core welding gun 20 comprises a welding wire 18A that comes out of the contact tip 18B. In addition, contact tip 18B is housed within tip holder 18C and has threads on its interior surface to engage corresponding threads 32 at an end of the flux core welding gun neck 20 (see FIG. 7).

Figure 6:
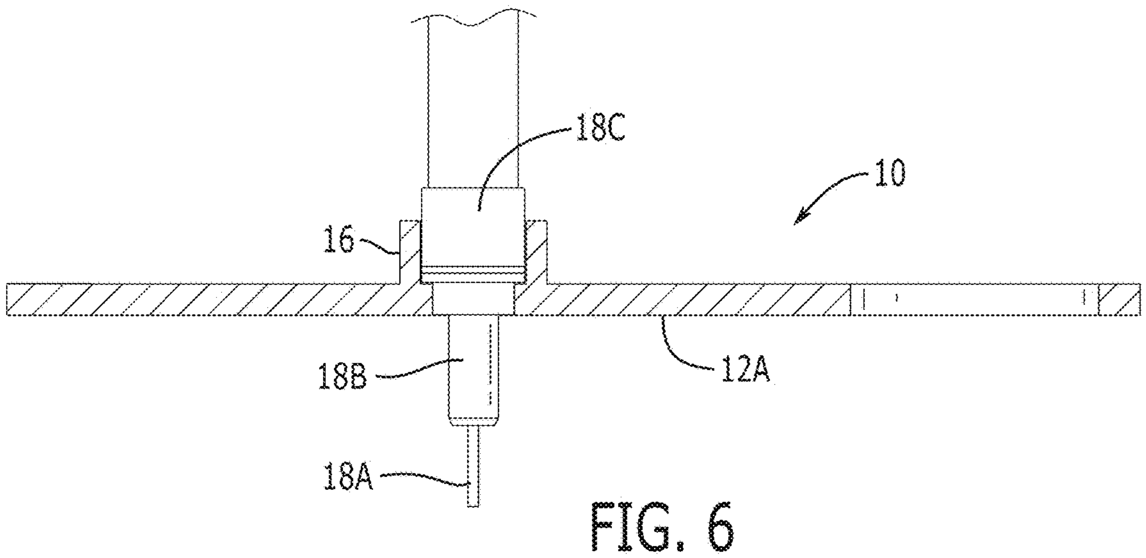
FIG. 6 is a cross-sectional view of a flux core welding gun wrench in use in accordance with a preferred embodiment of the present invention.
Figure 7:
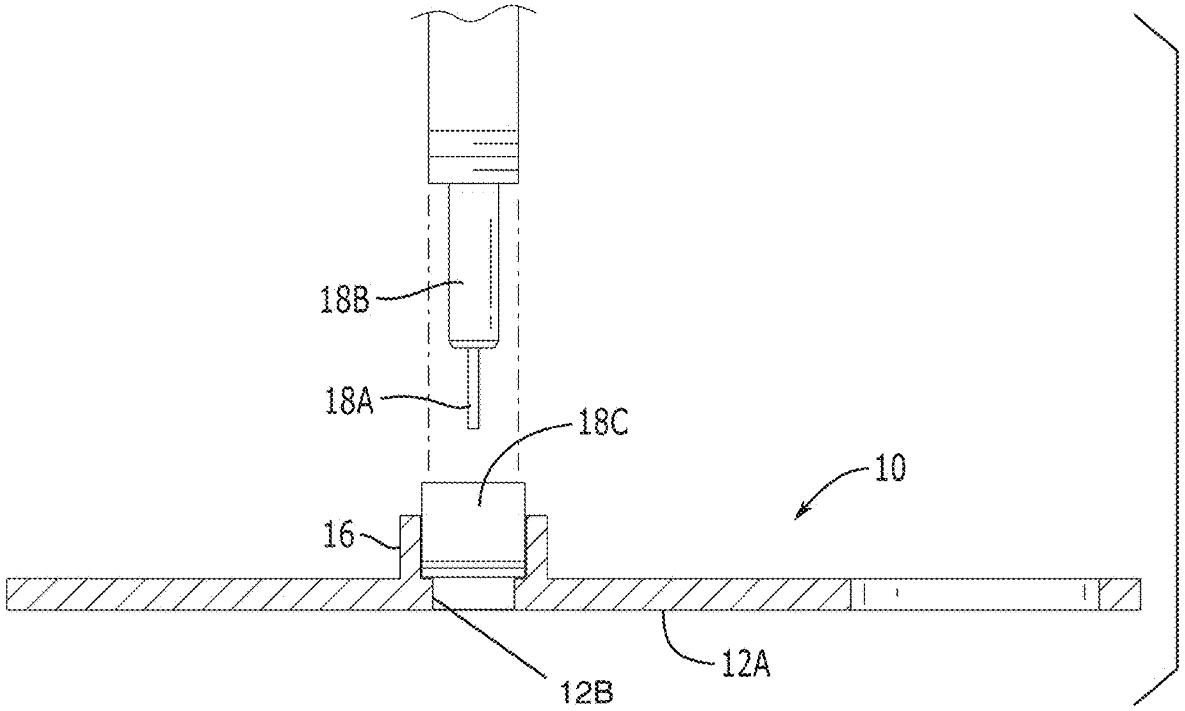
FIG. 7 is an exploded cross-sectional view of a flux core welding gun wrench in accordance with a preferred embodiment of the present invention.

To remove tip holder 18C from contact tip 18B, a user to position opening 28 of wrench 10 over the welding wire 18A so that wrench jaws 12B engage with flats 30 on welding tip 18C (see FIGS. 5-7, by way of example). The user can then turn wrench 10 to disengage tip holder 18C from contact tip 18B. As seen in FIG. 7, wrench 10 (and coupler tube 16 and wrench jaws 12B are designed to hold tip holder 18C to wrench 10 once removed.

It should be understood, of course, that the foregoing relates to exemplary embodiments of the invention and that modifications may be made without departing from the spirit and scope of the invention as set forth in the following claims.

What is claimed is:

1. A wrench to remove the tip holder from a flux core welding gun, said wrench comprising:

a base having a first end, a second end, a top side and a bottom side;

an opening extending through the top side of the base and bottom side of the base, and positioned proximate the center of the base between the first and second ends;

a coupler tube on the bottom side of the base at the opening;

the coupler tube having a first and a second wrench jaw on an inner surface of the tube;

wherein the first and second wrench jaws are constructed to engage corresponding wrench flats on a tip holder of a flux core welding gun.

2. The wrench of claim 1, further comprising an Allen key positioned at the first end of the base.

3. The wrench of claim 1, further comprising a second opening through the top and bottom surfaces of the base, the second opening positioned proximate the second end of the base.

4. The wrench of claim 1, wherein the coupler tube is designed to releasably hold the tip holder to the wrench once removed from the welding gun.

5. The wrench of claim 1, wherein the inner diameter of the inner surface of the coupler tube is designed to engage an outer surface of a tip holder of a flux core welding gun.

* * * * *